United States Patent [19]

Forgnone

[11] Patent Number: 5,325,898

[45] Date of Patent: Jul. 5, 1994

[54] DEVICE FOR COLLECTING VISCOUS FLUIDS

[76] Inventor: Gerard Forgnone, 1587 Turquoise Ct., Santa Maria, Calif. 93455

[21] Appl. No.: 119,516

[22] Filed: Sep. 10, 1993

[51] Int. Cl.⁵ .......................... B65B 1/04; B65B 3/04
[52] U.S. Cl. .................................. 141/106; 141/107; 141/332; 141/340; 141/375; 248/311.3
[58] Field of Search .............. 141/105, 106, 107, 319, 141/320, 321, 322, 331, 332, 333, 334, 340, 341, 342, 343, 364, 363, 375, 88; 222/129, 145; 248/371.3, 94

[56] References Cited

U.S. PATENT DOCUMENTS

| | | | |
|---|---|---|---|
| 447,643 | 3/1891 | Kersey | 141/106 |
| 932,931 | 8/1909 | Willmann | 141/106 |
| 2,071,944 | 2/1937 | Hoffman | 141/106 |
| 2,365,533 | 12/1944 | Elsebusch | 141/106 |
| 2,575,809 | 11/1951 | Hankins | 141/106 |
| 2,587,779 | 3/1952 | Smith | 141/106 |
| 2,726,488 | 12/1955 | Hankins | 141/106 |
| 3,156,270 | 11/1964 | Erickson | 141/106 |
| 3,192,970 | 3/1962 | Allen | 141/106 |
| 4,253,504 | 3/1981 | Rosen | 141/106 |
| 4,515,188 | 5/1985 | Brutsman | 141/106 |
| 4,832,095 | 5/1989 | Bonnell | 141/106 |
| 5,105,860 | 4/1992 | Connor | 141/106 |

*Primary Examiner*—Henry J. Recla
*Assistant Examiner*—Steven O. Douglas
*Attorney, Agent, or Firm*—McCubbrey, Bartels & Ward

[57] ABSTRACT

The device of the present invention is for the collection of viscous fluids, e.g. motor oil, from a plurality of containers having open necks. The device includes: a trough-like member having an upper end and a lower end; a plurality of container holders, operably joined to the trough-like member, for receiving the necks of the containers in an inverted, fluid draining position; and an outlet adjacent to the lower end of the trough-like member. The viscous fluid remaining in the inverted containers flows by gravity through at least a portion of the trough-like member to the outlet and the fluid can be collected in any receiving container that is positioned below the outlet. The device is capable of easily supported by any one of a number of alternative support means.

26 Claims, 3 Drawing Sheets

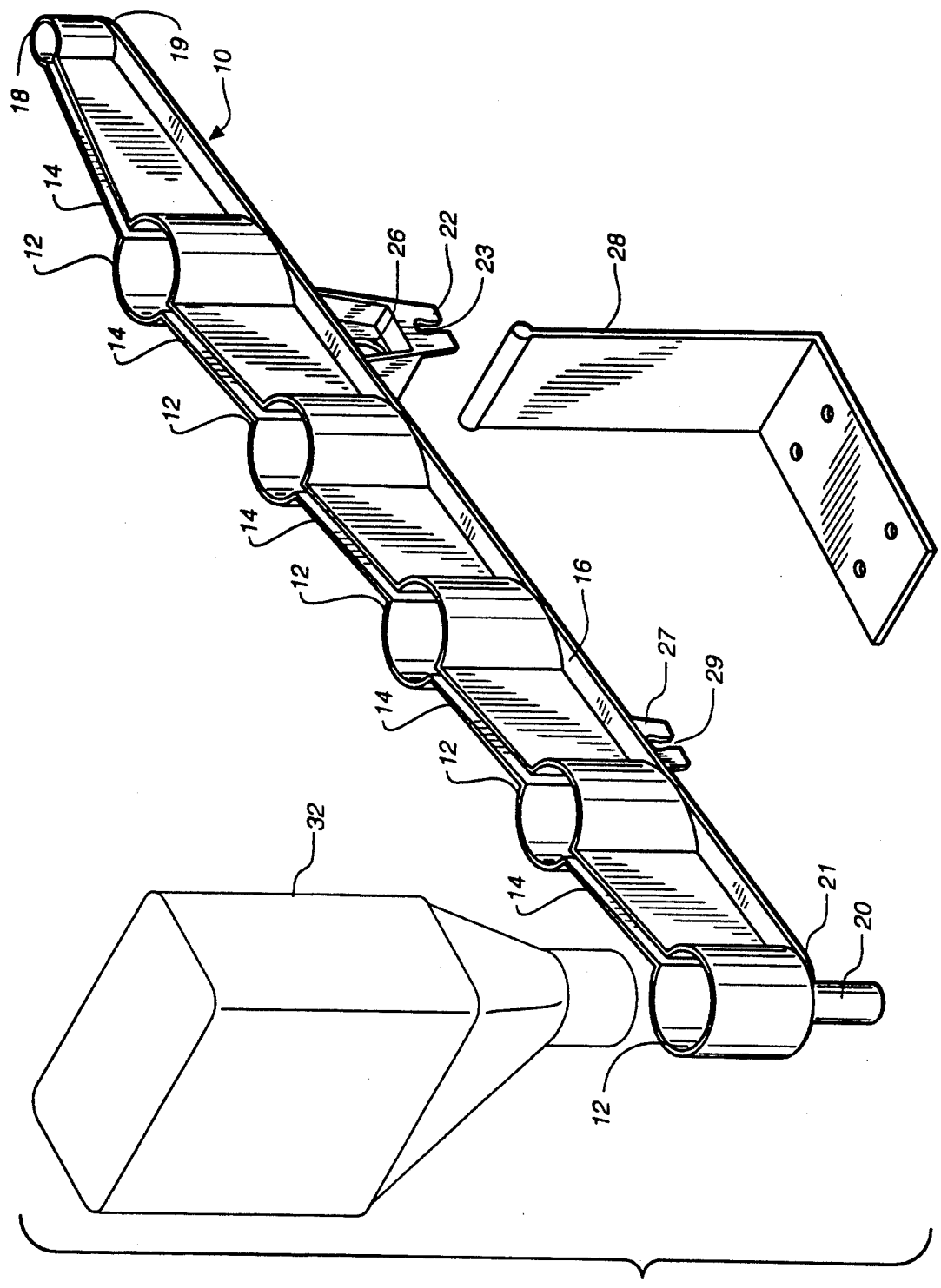
FIG._1

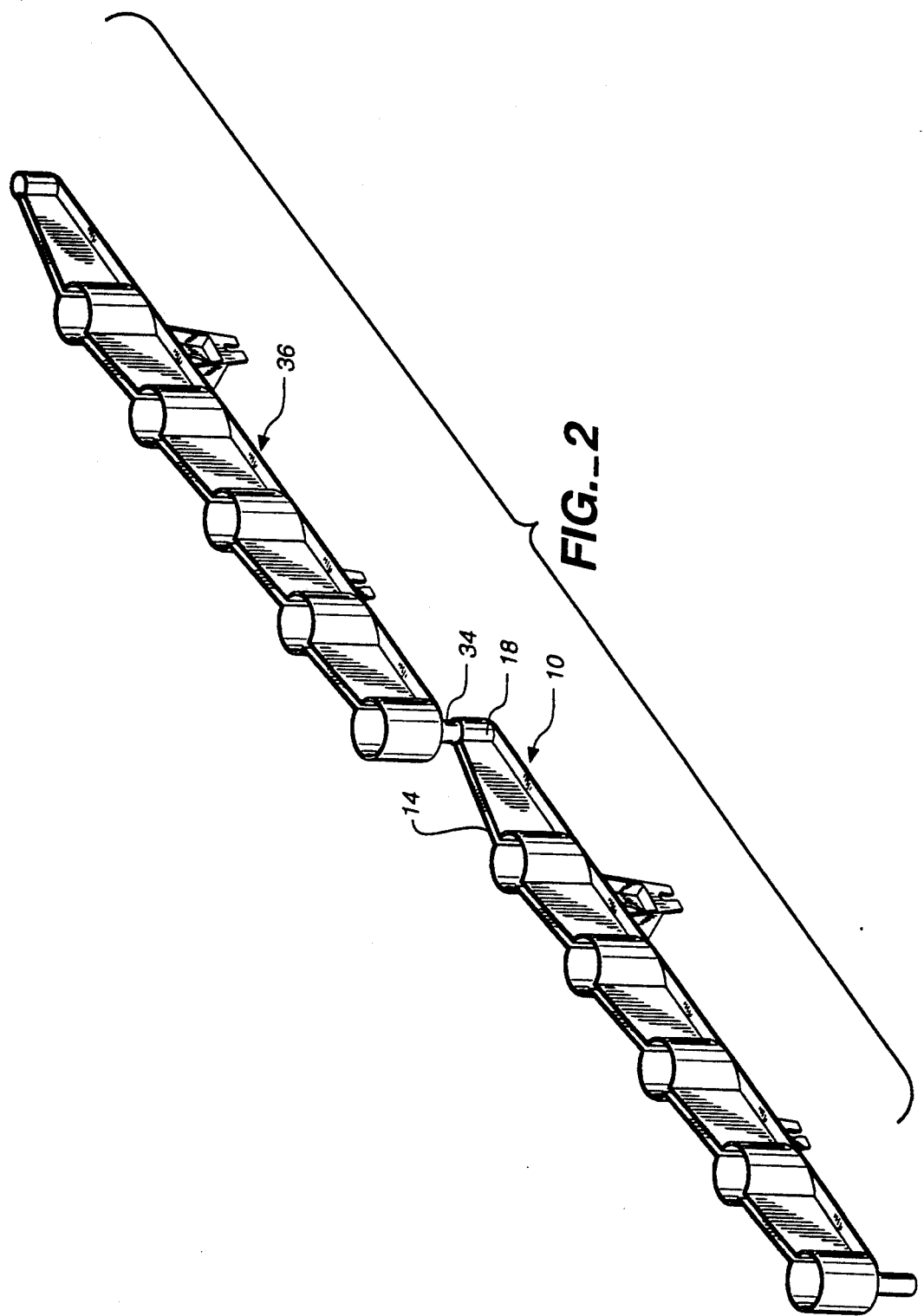

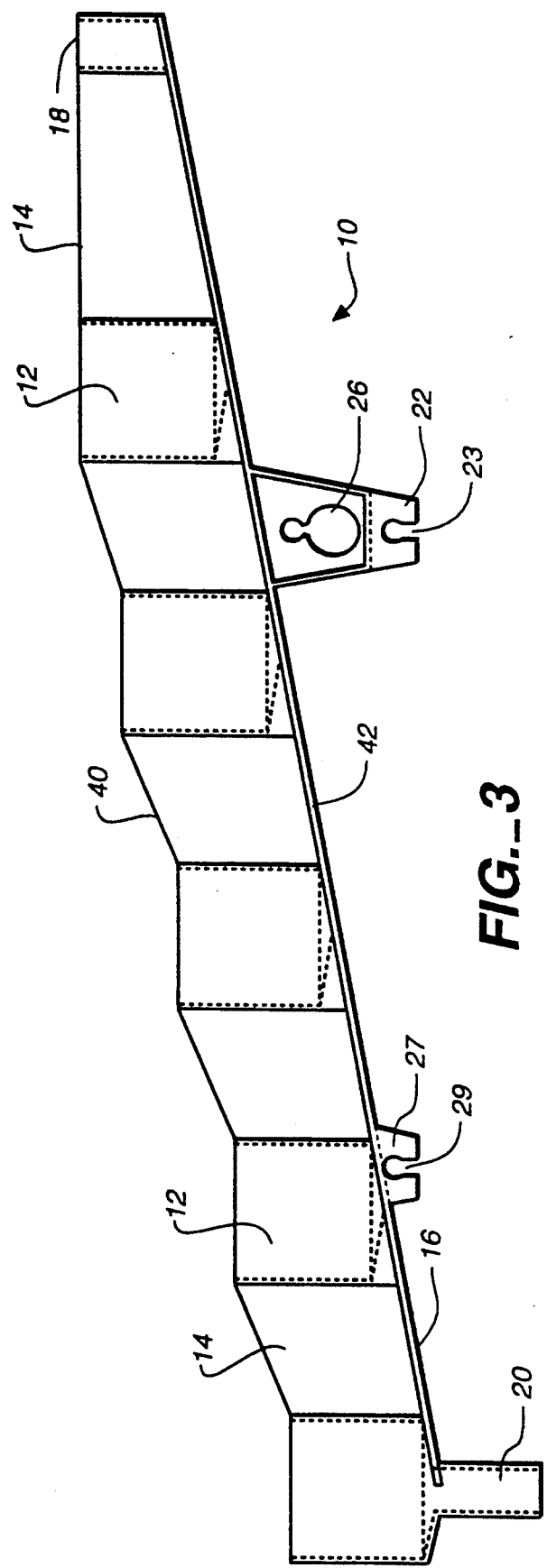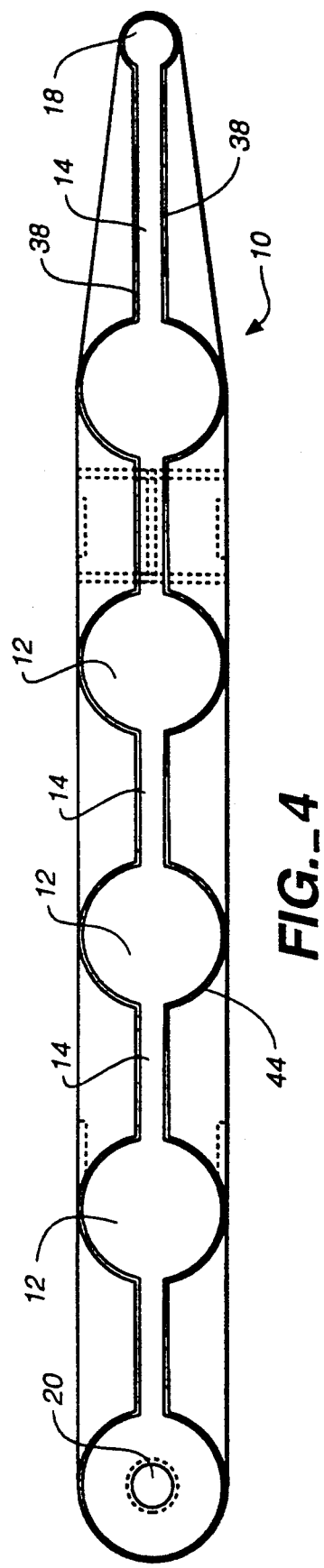

DEVICE FOR COLLECTING VISCOUS FLUIDS

BACKGROUND OF THE INVENTION

1. Field of the Invention

This invention relates generally to the field of fluid collection devices. More particularly, this invention relates to a collection device that routes viscous liquids from a plurality of containers, such as plastic oil bottles, to a singular container of any construction.

2. Description of the Prior Art

After a person dispenses the contents of a bottle filled with a viscous liquid such as motor oil, a small quantity of the liquid clings to the interior walls of the container. This small amount of oil is usually thrown away with the container because several minutes of draining are required to remove this residue. Due to ecological and economic concerns, there exists a need to reclaim this residue.

U.S. Pat. No. 4,832,095 issued to Bonnel describes a device for draining oil from a maximum of six cylindrical oil cans and/or six plastic bottles. This device arranges the containers in a two by three grid and drains them into a screw-on jar positioned beneath the integral funnel. The device has a provision to provide some stabilization by use of a key-hole shaped attachment to capture a nail or screw on a wall. Some disadvantages of this device are:

(1) its relatively large size, i.e., eight inches by twelve inches, assuming a four-inch diameter cylindrical can;

(2) its complexity, requiring separate pieces for the funnel, holding grid, and screw-on receptacle; and (3) its inherent instability since the small diameter receptacle bottle is its main support.

U.S. Pat. No. 5,105,860 issued to Connor describes a device for holding only one type of bottle at a time in the inverted position. The latter device is simple, but can handle only one bottle at a time, and does not provide a large receiver.

U.S. Pat. No. 4,515,188 issued to Brutsman shows a device for draining oil from a maximum of five cylindrical cans into a separate receptacle. This device is mounted to a wall by means of two holes for nails or screws. This device cannot drain the currently popular plastic oil bottles.

In view of the limitations of the prior art devices, it would be highly desirable to improve upon the collecting devices of the prior art so that a device is:

(1) capable of supporting multiple viscous fluid containers in an inverted position and permitting gravity flow of the liquid along a channel to empty into a receptacle;

(2) capable of allowing the user to empty the viscous fluid into any collection receptacle selected and provided by the user;

(3) capable of being manufactured by common molding of a plastic material;

(4) capable of easily being mounted to a wall, work bench or floor by a number of alternative support means; and (5) capable of being combined or hooked together.

SUMMARY OF THE INVENTION

Accordingly, the device of the present invention has each of above the advantages, objects, and features for collecting fluids from a plurality of containers having open necks. The device comprises:

a trough-like member having an upper end and a lower end, a plurality of container holders, operably joined to the trough-like member, for receiving the necks of the containers in an inverted, fluid draining position, and an outlet adjacent to the lower end of the trough-like member.

The viscous fluid, remaining in the inverted containers, flows by gravity through the trough-like member to the outlet. The fluid can then be collected in any receiving container positioned below the outlet.

The device is capable of easily being supported by any one of a number of alternative support means. For example, the device can be mounted:

(1) to a fiberboard wall of multiple, evenly spaced holes and pegs (commonly known as "peg board"), or (2) to a single lag screw or bolt to provide primary support and another screw, a nail, the receptacle, or another rigid member to provide secondary support, or (3) to a work bench, floor or other horizontal surface by means of a primary support that contacts the horizontal surface upon which the device rests and by means of a secondary support provided by the receiving container.

The upper end of the lowest device is joinable to the lower end of another device so that the total contents of the multiple devices drain downward to exit at the outlet of the lowest device.

Further objects, features and advantages of the device of the present invention will become apparent from a consideration of the drawings and the following description.

BRIEF DESCRIPTION OF THE DRAWINGS

FIG. 1 is an isometric view of the device of the present invention showing a primary support stand for the device;

FIG. 2 is an isometric view of a lower device of the present invention interconnected at its upper end to the lower end of another device;

FIG. 3 is a side view of the device of the present invention; and

FIG. 4 is a top view of the device of the present invention.

DETAILED DESCRIPTION OF THE DEVICE

Referring now to the drawings, collection device 10 is shown containing five cylindrically shaped bottle holders 12, shown with open ends up. The center lines of holders 12 are equally spaced and integrally positioned within common trough 14 having base 16. Trough 14 is angled from above 1 degree to less than 90 degrees from horizontal. Ganging receiver 18 is positioned at upper end 19 of trough 14. Outlet 20 at lower end 21 of trough 14 is a straight, open tube. Therefore, viscous fluid flowing through outlet 20 is not restricted to a special receptacle or receiving container. Collection device 10 has two supports located on its underside. Primary support 22, having snap groove 23 and keyhole 26, is located farthest away from outlet 20. Secondary support 27, having snap groove 29, is between primary support 22 and outlet 20. Snap groove 23 of collection device 10 is shown being clipped onto mounting stand 28. A plastic bottle 32 is shown in phantom in its inverted, draining position. Angled trough 14 provides that all of the viscous fluid travels in most cases along at least a portion of base 16 to outlet 20 at the bottom of lowest bottle holder 12. One exception to this flow pattern is when bottle 32 is positioned in holder 12 directly above outlet 20 as shown in FIG. 1. In the latter case, the fluid will flow directly into a receptacle (not shown) placed under outlet 20. It is apparent that if outlet 20 is placed farther down from the lowest bottle holder 12, all of the viscous fluid travels along at least a portion of trough 14.

FIG. 2 illustrates outlet 34 of second collection device 36 joined to device 10 by means of ganging receiver 18 to drain more than five bottles at a time. The additional unit 36 is joined at its lowest point where it mates internally to trough 14 of first unit 10. It is apparent that this arrangement may be repeated many times, as a third unit's outlet mates to the second unit's ganging receiver, and so on. The number of such units that are capable of being interconnected in this manner is only limited by the needs of the user and the space available.

Snap groove 23 of primary support 22 can also be utilized when mounted on a peg board wall (not shown) by means of conventional peg board hangers. The peg board is usually made of particle board having a large number of equally spaced holes and is mounted to the walls of a workshop, garage and the like. Collection device 10 can be connected to the peg board wall by means of a metal peg through snap groove 23 of primary support 22, using snap groove 23 which grasps the metal peg. Once supported by primary support 22, the user may support lower end 21 over an open neck or onto a shoulder of a receptacle (not shown). Alternatively, device 10 may be supported by means of secondary support 27. Secondary support can use the same type peg board hanger used as in primary support 22 or a nail, screw, or other rigid member.

When supporting the collection device or devices on walls other than the peg board type, such as wood, wood/plaster, metal, or any other type of structure, wood screws small enough to properly snap into the primary and secondary supports are usually not available with sufficient length to space the collection device out from the wall for proper function. Therefore, collection device 10 may be supported using a quarter-inch diameter lag screw support, commonly available in sufficiently long lengths. The lag screw support is provided directly above primary support 12, yet still below trough 14. This lag screw support embodiment of this invention is a keyhole shaped opening with the upper diameter being the same as the lag screw shaft, and the lower diameter being sufficiently large to pass the hex head of the lag screw. This shape of the hole allows the user to snap the collection device onto a lag screw that has been previously installed into the wall without the device in place. It also allows the device to be easily removed from the lag screw support without having to unscrew the lag screw from the wall. When using a lag screw as the principal means of support, some method is usually required to prevent the collection device from rotating about the axis of the lag screw. This rotation may be prevented by using of a nail, screw, or other rigid member inserted into the wall to interface with the collection device at or near secondary support 27, or by using a receptacle as a support at outlet 20.

FIGS. 3 and 4 shows that trough 14 is formed from two parallel, continuous strips 38 of material, e.g., recycled thermoplastic, having upper edges 40 and lower edges 42. Primary support 22 and secondary support 27 are shown in dotted line to support collection device 10 on each side of lower edge 42. Each of lower edges 42 is joined to approximately the center line of base 16 as shown in FIG. 3. Continuous strips 38 form a pattern of cylindrical-shaped lateral sections 44, which are the sidewalls of holders 12.

EXAMPLE

A functional prototype of the collection device shown in FIG. 1–4 was built using acrylic tubular shapes, acrylic flat sheet, and plastic cement. To make the trough, 1" square tubing was cut down the middle to form an open trough 1" wide with upstanding legs ⅛" tall, with a total length of approximately 14". To serve as 5 bottle holders, acrylic round tubing 1¼" inside diameter was cut to approximately 1" in length, with the lower end cut at a 10 degree angle to hold the plastic bottles in a vertical orientation when the trough to which the holders were cemented was inclined to 10° from horizontal. The holders were cemented to the open end of the trough at intervals of 2.6", and the ends of the trough were closed using flat acrylic sheet 1" wide and ⅛" high. The trough outlet was formed at the low point of the trough using ½" outside diameter tubing approximately 1" long, with one end cut at a 10° angle to allow the outlet to point straight down when the trough is inclined to 10°. The outlet was cemented to the trough after a hole was drilled at the low point of the trough. The primary and secondary supports were made from flat acrylic stock which was cemented to the side of the trough. Holes of 0.210" diameter were drilled near the edge of the flat stock so that the hole broke through the edge of the flat stock, creating a snap-type catch for peg board pins. The holes were placed so that the trough would be inclined at 10° from horizontal when the support holes were in the horizontal plane.

A functional test was performed by mounting the draining device to a peg board wall using two straight metal pegs of 0.206" diameter. An empty one-quart motor oil bottle was placed under the outlet of the apparatus, and five plastic bottles with residual 20W-50 oil were placed in the inverted position inside the bottle holders. The oil was observed to drain from the inverted bottles, flow down the inclined trough, through the outlet, and into the receptacle. At an ambient temperature of approximately 70° F., the 20W-50 oil drained from the five bottles in approximately 20 minutes. Approximately 5 fluid ounces were recovered.

What is claimed is:

1. A device for collecting residual fluids from a plurality of containers having open necks which comprises:
   a trough-like member having an upper end and a lower end;
   a plurality of container holders, operably joined to said trough-like member, for receiving said open necks of the containers in an inverted, fluid draining position;
   an outlet adjacent to the lower end of said trough-like member; and
   support means operably joined to said trough-like member for supporting said device at an angle from a horizontal surface so that said outlet is proximate to the container for collecting the fluid, said support means comprises a primary support member joined in the proximity of the upper end of said trough-like member and capable of releasably connecting to a mounting stand for mounting said device above the horizontal surface so that one of said open necks of the containers for collecting the fluid mates with said outlet in such a manner to provide secondary support for the device, whereby at least a portion of the residual fluid remaining in the inverted containers flows by gravity through said trough-like member to said outlet and the fluid can be collected in any container that is positioned below said outlet.

2. The device of claim 1 wherein the angle is at least 1° to less than 90°.

3. The device of claim 1 wherein said support means comprises a support member operably joined between the upper end and lower end of said trough-like member to give stability to said device and capable of releasably connecting to pegs, hooks, bolts, screws and other wall holders.

4. The device of claim 1 wherein said support means comprises a primary support member joined in the proximity of the upper end of said trough-like member and a secondary support member joined in the proximity of the lower end of said trough-like member, said primary support member giving primary stability to said device and being capable of releasably connecting to pegs, hooks, bolts, screws and other wall holders.

5. The device of claim 1 wherein at least one row of serially placed holders are operably joined to said trough-like member.

6. The device of claim 5 wherein said trough-like member has a pair of sidewalls and each of said holders is operably joined to said sidewalls.

7. The device of claim 1 wherein a single row of serially placed holders are operably joined to said trough-like member.

8. The device of claim 1 wherein a bottom container holder is operably joined to said trough-like member above said outlet whereby the fluid in an inverted container in said bottom container holder flows into said outlet.

9. The device of claim 8 wherein said bottom container holder is operably joined to said trough-like member directly over said outlet whereby the fluid in an inverted container in said bottom container holder flows directly into said outlet.

10. A mountable device for collecting residual viscous fluids from a plurality of containers having open necks which comprises:

a fluid collection trough-like member having an upper end, a lower end, a bottom and a pair of generally parallel sidewalls, which trough-like member is supportable so that the bottom of said member is at an angle from a horizontal surface of at least 1° to less than 90°;

a plurality of open ended, hollow cylinders for receiving said open necks of containers in an inverted, fluid draining position, at least a portion of the lateral surface of each of said cylinders is operably joined to the pair of sidewalls of said member to form a single row of serially placed cylinders; and an outlet adjacent to the lower end of said trough-like member and in fluid communication with the bottom of said member, whereby at least a portion of residual fluid remaining in the inverted containers flows by gravity along the bottom to said outlet and the fluid can be collected in any container that is positioned below said outlet.

11. The device of claim 10 wherein support means is operably joined to said trough-like member for supporting said device so that said outlet is proximate to the container for collecting the fluid.

12. The device of claim 11 wherein said support means comprises a support member operably joined between the upper end and lower end of said trough-like member to give stability to said device and capable of releasably connecting to pegs, hooks, bolts, screws and other wall holders.

13. The device of claim 11 wherein said support means comprises a primary support member joined in the proximity of the upper end of said trough-like member and a secondary support member joined in the proximity of the lower end of said trough-like member, said primary support member giving primary stability to said device and being capable of releasably connecting to pegs, hooks, bolts, screws and other wall holders.

14. The device of claim 11 wherein said support means comprises a primary support member joined in the proximity of the upper end of said trough-like member and capable of releasably connecting to a mounting stand for mounting said device above a horizontal surface so that the neck of the container for collecting the fluid mates with said outlet in such a manner to provide secondary support for the device.

15. The device of claim 11 wherein said support means comprises a primary support member joined in the proximity of the upper end of said trough-like member and capable of releasably connecting to a mounting stand for mounting said device above a horizontal surface so that the neck of the container for collecting the fluid mates with said outlet in such a manner to provide secondary support for the device.

16. The device of claim 10 wherein ganging means is operably joined to the upper end of said trough-like member for coupling with the outlet of another device so that at least two of said devices are in fluid communication with one another.

17. The device of claim 10 wherein a bottom container holder is operably joined to said trough-like member above outlet so that any fluid in an inverted container in said bottom container holder flows directly into said outlet.

18. A mountable device for collecting residual viscous fluids from a plurality of containers having open necks which comprises:

a fluid collection trough-like member having an upper end, a lower end, a bottom and a pair of generally parallel sidewalls, which trough-like member is supportable so that the bottom of said member is at an angle from a horizontal surface of at least 1° to less than 90°, each of said sidewalls comprising a continuous strip having an upper edge and a lower edge, at least a portion of the lower edge is joined to one edge of said bottom, said strip forming a pattern of a plurality of cylindrical-shaped lateral sections spaced in series along said strip such that the pair of sidewalls form a series of open ended, hollow cylindrical members for receiving said open necks of containers in an inverted, fluid draining position; and an outlet adjacent to the lower end of said trough-like member and in fluid communication with the bottom of said member, whereby at least a portion of residual fluid remaining in the inverted containers flows by gravity along at least a portion of the bottom of said member to said outlet and the fluid can be collected in any container that is positioned below said outlet.

19. The device of claim 18 wherein support means is operably joined to said trough-like member for supporting said device so that said outlet is proximate to the container for collecting the fluid.

20. The device of claim 19 wherein said support means comprises a support member operably joined between the upper end and lower end of said trough-like member to give stability to said device and capable of releasably connecting to pegs, hooks, bolts, screws and other wall holders.

21. The device of claim 19 wherein said support means comprises a primary support member joined in the proximity of the upper end of said trough-like member and a secondary support member joined in the proximity of the lower end of said trough-like member, said primary support member giving primary stability to said device and being capable of releasably connecting to pegs, hooks, bolts, screws and other wall holders.

22. The device of claim 19 wherein said support means comprises a primary support member joined in the proximity of the upper end of said trough-like member and capable of releasably connecting to a mounting stand for mounting said device above a horizontal surface so that the neck of the container for collecting the fluid mates with said outlet in such a manner to provide secondary support for the device.

23. The device of claim 18 wherein ganging means is operably joined to the upper end of said trough-like member for coupling with the outlet of another device so that at least two of said devices are in fluid communication with one another.

24. The device of claim 18 wherein a bottom container holder which is the cylindrical member formed in said trough-like member adjacent said outlet is positioned above said outlet so that any fluid in an inverted container in said bottom container holder flows into said outlet.

25. The device of claim 18 wherein a bottom container holder which is the cylindrical member formed in said trough-like member adjacent said outlet is positioned over said outlet so that any fluid in an inverted container in said bottom container holder flows directly into said outlet.

26. A device for collecting residual fluids from a plurality of containers having open necks which comprises:
- a trough-like member having an upper end and a lower end;
- a plurality of container holders, operably joined to said trough-like member, for receiving said open necks of the containers in an inverted, fluid draining position;
- an outlet adjacent to the lower end of said trough-like member; and
- ganging means formed in the upper end of said trough-like member for coupling with an outlet of another said device so that at least two of said device are adaptable to be in fluid communication with one another,
- whereby at least a portion of residual fluid remaining in the inverted containers flows by gravity through said trough-like member to said outlet and the fluid can be collected in any container that is positioned below said outlet.

* * * * *